(12) United States Patent
Eichin et al.

(10) Patent No.: US 7,236,743 B2
(45) Date of Patent: Jun. 26, 2007

(54) METHOD AND ARRANGEMENT FOR NOISE REJECTION IN A RECEIVER CIRCUIT

(75) Inventors: Matthias Eichin, Heilbronn (DE); Alexander Kurz, Schwaebisch-Hall (DE); Karl-Ulrich Stahl, Erfurt (DE)

(73) Assignees: Vishay Semiconductor GmbH, Heilbronn (DE); Atmel Germany GmbH, Heilbronn (DE); Melexis GmbH, Erfurt (DE)

( * ) Notice: Subject to any disclaimer, the term of this patent is extended or adjusted under 35 U.S.C. 154(b) by 456 days.

(21) Appl. No.: 10/344,141

(22) PCT Filed: Aug. 3, 2001

(86) PCT No.: PCT/EP01/09002

§ 371 (c)(1),
(2), (4) Date: Feb. 7, 2003

(87) PCT Pub. No.: WO02/13403

PCT Pub. Date: Feb. 14, 2002

(65) Prior Publication Data

US 2003/0171108 A1    Sep. 11, 2003

(30) Foreign Application Priority Data

Aug. 8, 2000    (DE) ................ 100 38 616

(51) Int. Cl.
*H04B 1/00*    (2006.01)
*H04B 15/00*    (2006.01)
*H04B 17/02*    (2006.01)
*H04B 1/10*    (2006.01)

(52) U.S. Cl. ............... 455/63.1; 455/136; 455/138; 455/139; 375/350; 375/351

(58) Field of Classification Search ........... 455/63.1, 455/63.4, 114.1, 114.2, 130, 136, 138, 139, 455/175.1, 176.1, 180.1, 188.1; 375/350, 375/351
See application file for complete search history.

(56) References Cited

U.S. PATENT DOCUMENTS 4,553,049 A    11/1985    Cha et al.

(Continued)

FOREIGN PATENT DOCUMENTS

DE    3537654    4/1987

(Continued)

OTHER PUBLICATIONS

"TPS831", Toshiba Data Sheet, XP002184335, "Toshiba Photo IC, Si Monolithic Photo IC", Dec. 10, 1997, 4 pgs.

*Primary Examiner*—Nay Maung
*Assistant Examiner*—Andrew Wendell
(74) *Attorney, Agent, or Firm*—W. F. Fasse; W. G. Fasse

(57) ABSTRACT

In a method for interference suppression using a quality-adjustable bandpass filter in a receiver circuit for carrier-modulated received signals ($S_{IN}$), the bandpass filtered received signal ($B_{out}$) is demodulated, and a switching process is triggered with the demodulated received signal ($D_{out}$). In order to eliminate internal or self-induced interferences that would be caused by a switching process in the output portion of the receiver, a quality reduction of the bandpass filter is correlated with the switching process that causes the interference. The method is especially suitable in connection with circuits for infrared receivers, which can thereby be manufactured in a small size, without external components, and thus economically.

20 Claims, 3 Drawing Sheets

U.S. PATENT DOCUMENTS

| | | |
|---|---|---|
| 5,303,413 A | 4/1994 | Braegas |
| 5,361,404 A * | 11/1994 | Dent .......................... 455/135 |
| 5,369,470 A | 11/1994 | Hansen |
| 5,426,666 A * | 6/1995 | Kato .......................... 375/141 |
| 5,926,750 A * | 7/1999 | Ishii .......................... 455/130 |
| 6,233,442 B1 | 5/2001 | Koda et al. |
| 2004/0002321 A1* | 1/2004 | Sorrells et al. ............. 455/323 |
| 2004/0151237 A1* | 8/2004 | Ferry et al. .................. 375/219 |

FOREIGN PATENT DOCUMENTS

| | | |
|---|---|---|
| DE | 3818749 | 12/1989 |
| DE | 4005272 | 8/1991 |
| DE | 4232377 | 3/1994 |
| DE | 19841236 | 3/1999 |

* cited by examiner

METHOD AND ARRANGEMENT FOR NOISE REJECTION IN A RECEIVER CIRCUIT

FIELD OF THE INVENTION

The invention relates to a method for interference suppression by means of a quality-adjustable bandpass filter in a receiver circuit for carrier-modulated received signals as well as a circuit arrangement for carrying out this method.

BACKGROUND INFORMATION

Known integrated circuits (IC) for such receiver circuits, especially remote control receivers, such as, for example, the U2548 from Temic Semiconductor GmbH, have larger dimensions due to their technology, and therefore have a small interference coupling. Their size amounts to approximately 1.8 mm$^2$. On the useful surface, these circuits comprise connection devices for the input signal, the output signal, the supply voltage, the ground connection and several adjusting or tuning devices. The functional operation of such a circuit consists in that the signal received from a photodetector, generally a photodiode—the received signal—is fed into an input circuit. The input circuit comprises a transimpedance amplifier, which amplifies pulsing input current signals and transforms them into voltage signals. These voltage signals are then processed in a signal preparation or processing device. The signal processing device comprises a regulating amplifier, a limiter, and a bandpass filter. In this context, the purpose of the regulating amplifier is to amplify the output voltage of the transimpedance amplifier according to the prescribed regulation. The limiter has the purpose of limiting the signal level swing or range, in order to avoid overdriving the bandpass filter. The bandpass filter enables the selectivity of the receiver and limits its bandwidth. The signals at the output of the bandpass filter are evaluated in a demodulator as an evaluating circuit. This demodulator consists of comparators, an integrator and a Schmitt trigger, and generates a switching signal for a driving transistor functioning as a switch, whereby a digital control signal is provided, for example to a microcontroller for further processing.

This known circuit further includes an amplification regulation, by means of which the amplification of the receiver is regulated or adjusted to correspond to an interference field, whereby a high sensitivity for the received signals is achieved, while nonetheless simultaneously, interfering influences, which may for example arise due to extraneous light, are suppressed to a great extent, so that hereby as far as possible no output pulses are generated by the driving transistor.

This known circuit, however, has the disadvantage, that its circuit surface area is reduced through the application of new technologies, whereby, due to switching processes in the output portion of the receiver, especially through the driving transistor, interferences or disturbances are caused, for example in the form of oscillator oscillations due to the capacitive couplings and ground potential reduction that are now effective within the circuit, whereby these interferences or disturbances cannot be removed by the amplification regulation.

To solve such problems, it is known from a Toshiba Data Sheet regarding the monolithic integrated photo circuit TPS831, to connect an external capacitor of the size 1000 pF between the output terminal or connection $V_0$ and ground terminal or connection GND, in order to prevent oscillations—as it is termed therein. The evident disadvantage of this solution is that additional costs are caused in addition to the chip costs, due to the additional component, and that the demodulated output pulse is corrupted or falsified through this capacitor.

SUMMARY OF THE INVENTION

Therefore, it is an object of the invention, to specify a method of the initially mentioned type, in which the mentioned internal or self-induced interferences can be suppressed, without comprising the disadvantages described from the prior art.

According to this, an active interference suppression of internal or self-induced interferences due to switching processes at the output of the receiver circuit is achieved by a time-limited reduction of the quality of the bandpass filter in the moment at which the interference arises, namely during the switching and directly following the switching process. Preferably, the time duration of the quality reduction is limited at least to the duration of the interference triggered by the switching process, namely so long until the interference has decayed or been damped.

According to an advantageous further development of the invention, a control signal for the quality reduction of the bandpass filter is derived dependent on the output signal of the demodulator, which, as the first rectangular or square pulse, corresponds to the envelope curve of the carrier-modulated received signal, and, as a switching signal, is provided to a driving transistor as an output transistor of the receiver. This is achieved in that, dependent on the edges or flanks of the first rectangular pulse, a further phase shifted rectangular or square pulse is generated, whereby this further phase shifted rectangular pulse preferably joins or immediately follows in time on the first rectangular pulse. Since a switching process, for example switching-on of an abovementioned switch, is initiated with the first edge or flank of the first mentioned rectangular pulse, and with its second edge or flank, the switching process is ended, for example by switching-off this switch, one can thereby achieve a correlation of the interference with the quality reduction in a simple manner.

Moreover, the rectangular pulse generated by the demodulator is derived from the bandpass filtered received signal in that, first, pulse trains are generated from this received signal by means of quantization, and these pulse trains are then integrated up to an integrated value, whereby the missing or omission of pulse trains leads to a restoring or return of this integral value.

In a further advantageous example embodiment, an automatic amplification regulation or automatic gain control of the received signal is provided by means of a regulating amplifier, to which the received signal is provided before the bandpass filtering. The regulation is carried out dependent on the signal magnitude of the received signal and the ambient or environmental conditions—namely especially the surrounding interference field—of the receiver circuit. In order to also prevent an interference that is possibly caused by this regulation, this amplification regulation is switched to inactive during the demodulation of a bandpass filtered received signal—namely during the reception of a valid data bit. Preferably, for switching the automatic amplification regulation to inactive, a third rectangular pulse that is phase shifted relative to the first rectangular pulse (output signal of the demodulator) is generated, whereby the pulse width of this third rectangular pulse is longer than that of the first rectangular pulse.

Finally, the output signal of the demodulator (first rectangular pulse), the control signal for the quality reduction of the bandpass filter (second rectangular pulse) and the control signal (third rectangular pulse) for switching the automatic amplification regulation to inactive are derived preferably dependent on the integral values, both during the integration as well as during the restoring or return.

An advantageous circuit arrangement for carrying out the method according to the invention is further described herein and additionally achieves the above object.

Such a receiver circuit for carrying out the method according to the invention is manufactured as a monolithic circuit, which simply requires a photodiode in order to be able to operate as a receiver for infrared remote controls, and can already demodulate very small currents in the range of a few hundred pikoamps, whereby this, however, requires a high transimpedance on the order of magnitude of 300 mΩ. On the other hand, the driving transistor at the output of the demodulator switches the full logic level swing or range (for example 5 V) at a maximum current of up to several mA. In a realization of this circuit with new technologies leading to smaller dimensions of the chip, for example with a chip surface area of 1 mm², the described internal or self-induced interferences or disturbances (oscillations) will arise due to the now smaller spacing distances and due to the couplings to the input of the receiver circuit caused by the high voltage swing or range of the driving transistor. Independent of the chip size, such a circuit also tends toward oscillations due to the ground potential reduction caused by the driving current. With the method according to the invention, all of the described interferences or disturbances are suppressed, and in fact independently of the dimensions of the chip, so that the invention will still be advantageously applicable in connection with future technologies, which lead to further size reductions.

BRIEF DESCRIPTION OF THE DRAWINGS

The method according to the invention shall be described in the following with respect to an example embodiment in connection with the drawings, wherein.

DETAILED DESCRIPTION OF A PREFERRED EXAMPLE EMBODIMENT OF THE INVENTION

Figure 1:
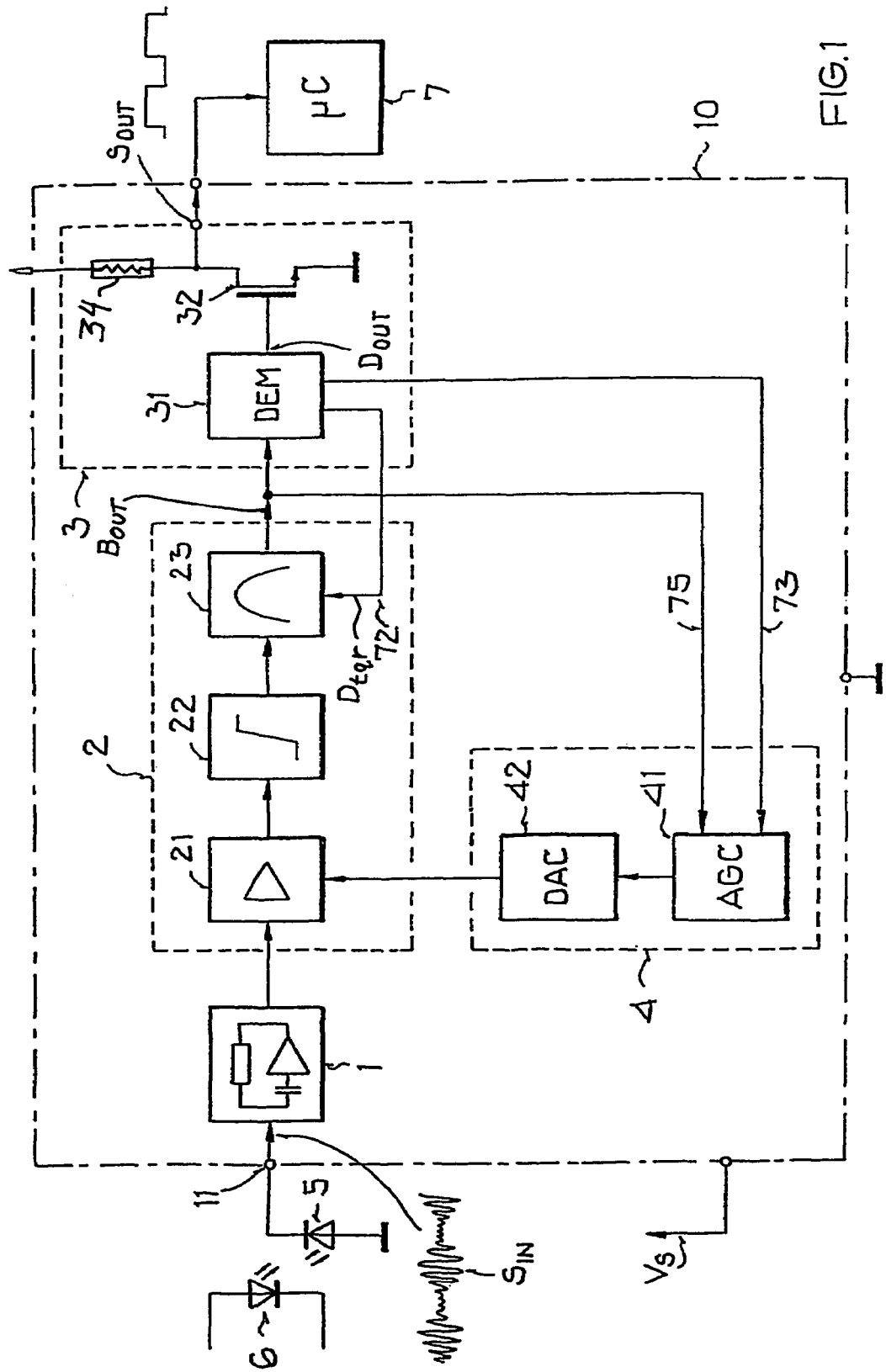
FIG. 1 shows a block circuit diagram of a receiver circuit according to the invention.

FIG. 1 shows a block diagram of a receiver circuit 10 and its surrounding environment. The carrier-modulated data radiated or emitted by an optical transmitting diode 6 are received as infrared pulse packets by a photodiode 5. These infrared pulse packets with a carrier frequency of e.g. 38 kHz, which impinge on the photodiode 5, are converted into electrical current signals $S_{IN}$. They are present at the input terminal or connection 11 of the receiver circuit 10. These electrical current signals $S_{IN}$ are provided to an input circuit 1 functioning as a transimpedance amplifier, which amplifies the current signals $S_{IN}$ and converts them into voltage signals. In this context, the converted voltage must be large enough to make the noise component negligible in the following signal processing stages. In the following signal preparation or processing element 2, these voltage signals are again amplified by means of a regulating amplifier 21, limited by means of a limiter 22, and then filtered in a bandpass filter 23, whereby this bandpass filter 23, in addition to its analog input, additionally has a control input, with which the quality of the bandpass filter is switchable between two values.

The signal limiting by means of the limiter 22 is therefore necessary, in order to avoid an overdriving of the following bandpass filter 23 and to suppress pulse-form interferences or disturbances, which get into the receiver, for example, through a supply connection $V_s$. In an evaluating element 3 connected to and following the signal processing element 2, the bandpass filtered signal $B_{out}$ is demodulated by means of a demodulator 31, and then provided as an output signal $S_{OUT}$ over a driving transistor 32 with an associated load resistor 34, to a microcontroller 7 for further processing. The demodulator 31 also generates a control signal $D_{tqr}$, which is provided via a line 72 to the control input of the bandpass filter 23. Hereby, the quality of the bandpass filter 23 is reduced temporarily for a short time in connection with and following a switching process of the driving transistor 32, in order to prevent the triggering of an oscillator oscillation due to the switching process carried out with the driving transistor 32, in order to thus counteract an interference coupling in the receiver circuit embodied as an integrated circuit. Thus, the bandpass filter 23, which operates on a carrier frequency of the useful signals and enables the selectivity of the circuit, has a quality of, for example 10, which can be reduced to 1 due to the control signal $D_{tqr}$, as will be explained further below.

In order to optimize the amplification of the useful signal emitted by the transmitting diode 6 and therewith the sensitivity of the receiver, the receiver circuit 10 comprises a regulating circuit 4, which provides regulating signals to the regulating amplifier 21, and which on its part receives as input signals the output signal $B_{out}$ of the bandpass filter 23 via a line 75 as well as a signal $D_{stop-agc}$ generated by the demodulator via a line 73. The purpose of this regulating circuit 4 is to optimize the signal to noise ratio in that the amplification of the input signal $S_{IN}$ is varied dependent on the magnitude of the input signal. The regulating circuit 4 is built of a regulating logic element (AGC) 41 and a digital-to-analog converter (DAC) 42. The regulating logic element 41 separates the useful signal from the interference signals and adjusts the amplification for the useful signals to a highest possible level, whereby a high sensitivity for the useful signals is achieved. Simultaneously, interfering influences from, for example, extraneous light, are reduced. The digital-to-analog converter 42 converts the digital amplifier information generated by the regulating logic element 41 into an analog control voltage for the regulating amplifier 21.

In the following, the functional operation of the demodulator 31 will be described in detail in connection with the FIG. 2 and the associated pulse diagram according to FIG. 3, especially the correlation between the output signal $D_{OUT}$ of the demodulator 31 which switches the driving transistor 32 and the control signal $D_{tqr}$ which reduces the quality of the bandpass filter 23 shall be illustrated.

Figure 2:
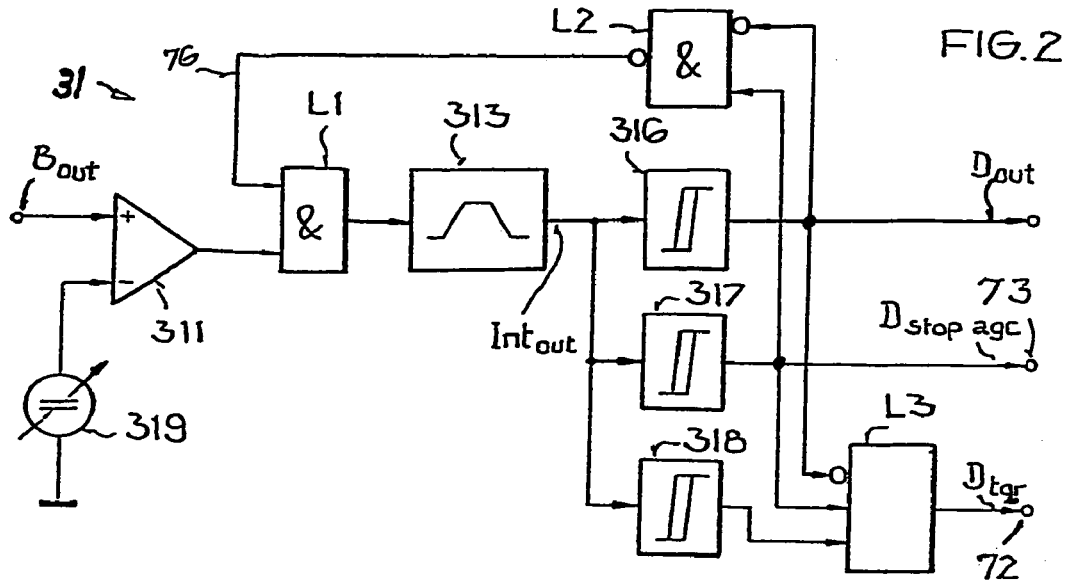
FIG. 2 shows a block circuit diagram of a demodulator used in the receiver circuit according to FIG. 1.

According to FIG. 2, the output signal $B_{OUT}$ coming from the bandpass filter 23 is digitized with a comparator 311, whereby the threshold voltage 319 represents a fixedly set reference value, which, however, in comparison to the band filter idle or quiescent level, can also be adjusted and set over several steps or stages in a signal dependent manner. The digital signals of the comparator 311 as pulse trains $Comp_{sig}$ (see pulse diagram 311 in FIG. 3) are integrated in an analog integrator circuit 313. This integrator 313 recognizes the conditions charging or discharging out to the overload limits 0% or 100%, whereby a limited integral voltage course (see pulse diagram 313 in FIG. 3) is generated as an output signal $Int_{out}$. Three Schmitt triggers 316, 317, 318 with different hysteresis characteristics are connected in circuit at the output of the integrator 313. In the application example, the switching-on and switching-off processes lie at 80% and 40% for the Schmitt trigger 316 (see pulse diagram 316 in FIG. 3), at 85% and 10% for the Schmitt trigger 317 (see pulse diagram 317 in FIG. 3), and at 80% and 25% for the Schmitt trigger 318 (see pulse diagram 318 in FIG. 3). The control signals $D_{tqr}$ (72), $D_{stop-agc}$ (73) and 76 are obtained from the time overlap of the three Schmitt trigger output signals $D_{out}$, $D_{stop-agc}$ and 318 with the aid of the logical connections L2 and L3.

Figure 3:
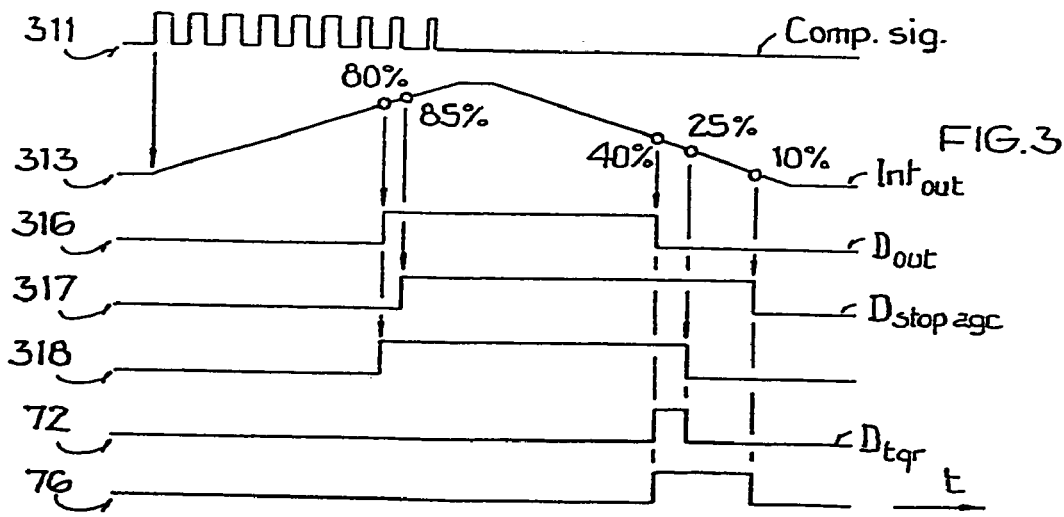
FIG. 3 shows a logic diagram for explaining the functional operation of the demodulator according to FIG. 2.

It can be seen from the pulse diagram of FIG. 3, that the positive edge of the rectangular demodulator output signal $D_{out}$ is generated at an increasing integrator value of 80% of the maximum value (100%), and the negative edge is generated at a resetting or returning value of the integrator value of 40%. In a corresponding manner, using the above named values, the rectangular signal $D_{stop-agc}$ (317) is generated, which is provided to the regulating logic element 41, in order to hold the regulation of the regulating element 4 inactive during and a short time after the transmission of a valid data bit. Thereby, also an influence of the interference from the driving transistor on the regulating circuit 4 shall be avoided. The rectangular signal 318, the signal $D_{stop-agc}$ (317) and the inverted signal $D_{out}$ are anded together with a NAND gate L3 for generating the control signal $D_{tqr}$ (72). Thereby the positive edge of the rectangular signal 72 is generated if the $D_{out}$ signal takes its low level, whereas its negative edge corresponds in time with that of the rectangular signal 318.

A further rectangular signal 76 is generated with the inverted $D_{out}$ signal 316 and the $D_{stop-agc}$ signal 317 by means of a NAND gate L2, which further rectangular signal 76 is provided together with the $Comp_{sig}$ pulse trains 311 generated by the comparator 311 to an AND gate L1. The pulse duration of this rectangular pulse 76 corresponds to the time duration from the pulse end of the $D_{out}$ signal 316 to the pulse end of the $D_{stop-agc}$ signal 317. Thereby an after-triggering of the comparator 311 during the inactive-switching of the regulating circuit 4 is prevented.

Figure 4:
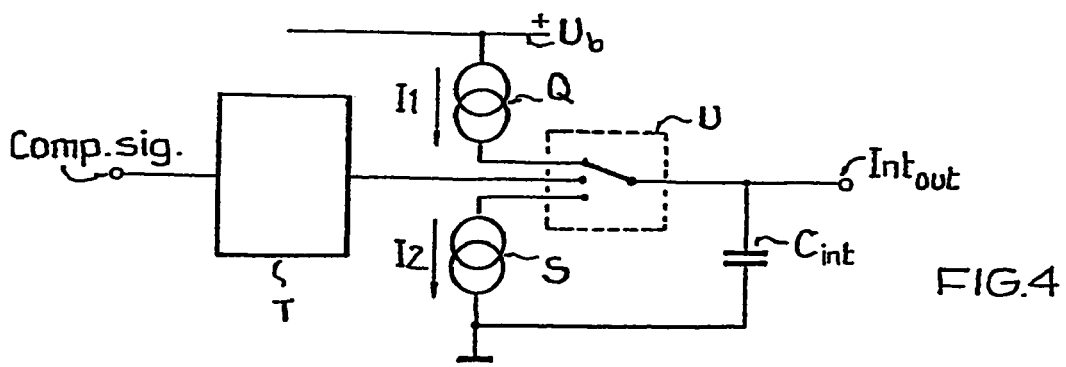
FIG. 4 shows a block circuit diagram of an integrator used in the receiver circuit according to FIG. 1.
Figure 5:
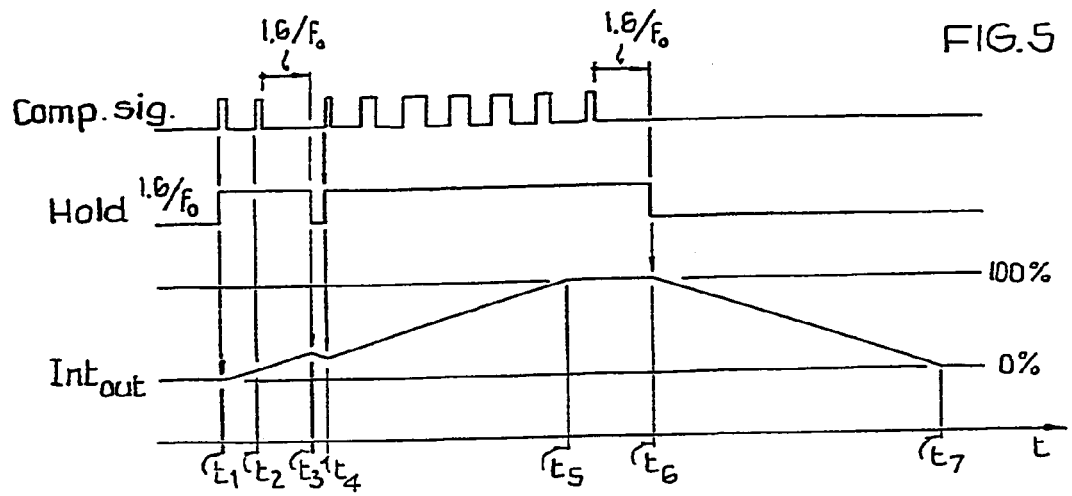
FIG. 5 shows a logic diagram for explaining the functional operation of the integrator according to FIG. 4.

The analog integrator 313 used in the demodulator 31 integrates the digitized pulse trains $Comp_{sig}$, and can be realized in this context in a simple manner as will be described in the following, by way of example, in connection with the FIG. 4 and the associated pulse diagram according to FIG. 5. The pulse train $Comp_{sig}$ shown as an example in FIG. 5 contains pulses of varying duration with varying pulse pauses, and is provided to a trigger and holding element T, which switches on a current source Q with the occurrence of a first pulse, which current source Q charges an integration capacitor $C_{int}$ with a current I1. Thereby, incomplete pulse trains must be recognized by the demodulator 31 as being incomplete, and may not lead to an output signal. The holding function of the trigger and holding element T serves for this purpose, with which, after completion of a certain time duration, which can be selected in a frequency dependent manner according to $1.6/f_0$, the upwards integration is interrupted due to a lack of a pulse, and a negative or downwards integration with the same speed is started, in that the current sink S is now switched on for discharging the integration capacitor $C_{int}$. Such a holding function is shown with the pulse diagram Hold $1.6/f_0$ and shows that the pulse pause between the first two pulses at the time points $t_1$ and $t_2$ is bridged over, i.e. the integration is further continued during these pulse pauses, however, this is not the case completely for the one following the second pulse, namely between the time points $t_2$ and $t_3$. Therefore, the upwards integration is carried out only until the expiration of the holding time $1.6/f_0$, i.e. until the time point $t_3$. Thereafter, the trigger and holding element T switches to the current sink S for the purpose of discharging the integration capacitor $C_{int}$ with a current $I_2$ until the time point $t_4$, at which the next pulse arrives for the upward integration, which is carried on until reaching the maximum integration value of 100% at the time point $t_5$, despite that still further pulses are present and the holding time $1.6/f_0$ negative or downward integration is carried out until the time point $t_7$, at which the integration value of the integrator output signal $Int_{out}$ has again reached its output value of 0%.

Figure 6:
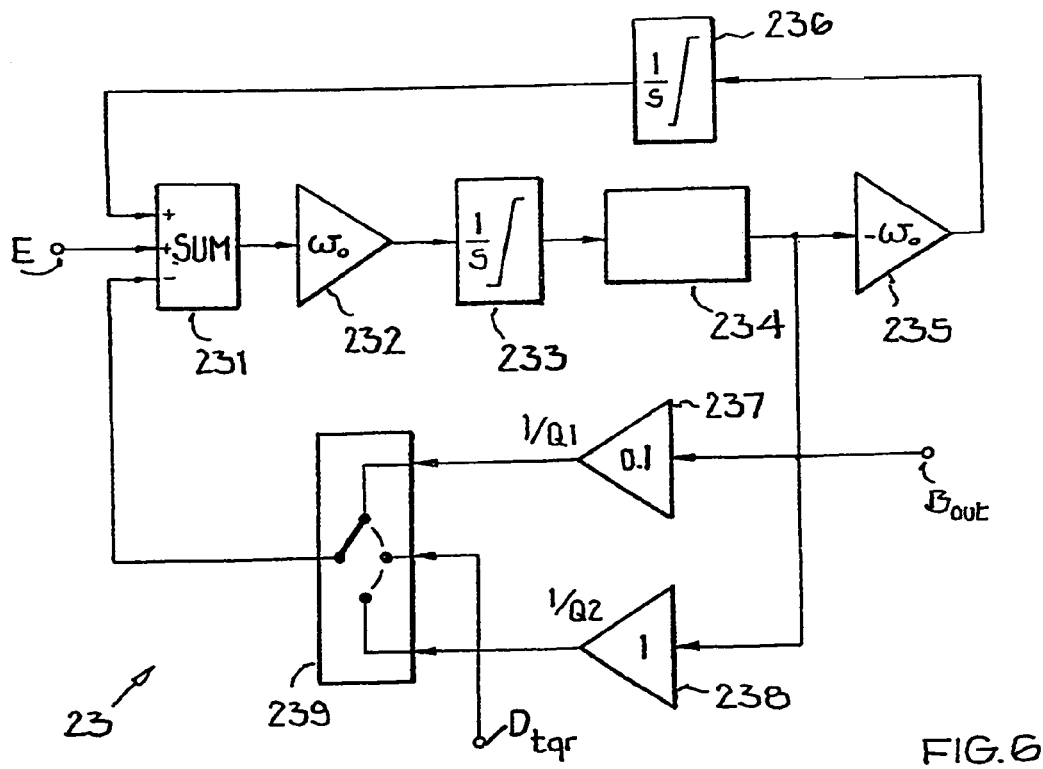
FIG. 6 shows a basic principle circuit diagram of a gyrator bandpass filter used in the receiver circuit according to FIG. 1.

An exemplary construction of a quality-adjustable bandpass filter 23 is shown in FIG. 6 and can be used in the receiver circuit according to FIG. 1. This illustrated bandpass filter represents a gyrator filter of the second order, of which the general transfer function F(s) is given by the following formula:

$$F(s)=(s/\omega_0)/(1+(s/(\omega_0 Q)+(s^2/\omega_0^2))),$$

whereby s represents the Laplace transform, $\omega_0$ represents the resonance frequency, and Q represents the quality. The circuit described next realizes or carries out this transfer function.

According to FIG. 6, the analog signal limited by the limiter 22 is provided via the input terminal or connection E of the bandpass filter to the positive input of a summer 231 having three inputs (two positive inputs and one negative input). The sum signal formed from the signals present at the three inputs is amplified by the factor $\omega_0$ with an amplifier 232, and is provided further to a limiting integrator 233 which represents or simulates a capacitance. Next, the integrated signal is formed by a signal former 234 that represents or simulates a transistor characteristic function, and forms the output signal $B_{out}$ of this bandpass filter 23. Simultaneously, this output signal $B_{out}$ is provided on the one hand to the second positive input of the summer 231 via a feedback coupling, consisting of a further amplifier 235 with the amplification factor $-\omega_0$ and a further integrator 236 connected thereafter, which integrator 236 has a construction corresponding to the integrator 233, and on the other hand respectively via an amplifier 237 and 238 to a change-over switch 239, which, dependent on the control signal $D_{tqr}$ delivered thereto, connects either the amplifier 237 with an amplification factor 0.1 (=$1/Q_1$)—corresponding to a quality value 10—or the amplifier 238 with an amplification factor 1 (=$1/Q_2$)—corresponding to a quality value 1—to the negative input of the summer 231.

Through the reduction of the quality during the high level of the $D_{tqr}$ signal—thus, during the moment of switching off the driving transistor 32 and for a short time thereafter—the filter is shifted to a condition of smaller energy take-up capacity, so that the interference caused by the driving transistor 32 in the form of a step or discontinuity at the bandpass input can decay more quickly. The time duration in which the control signal $D_{tqr}$ is active must be as long as the interference of the driving transistor 32 continues in the circuit components connected before the bandpass filter 23. A negative influence of the demodulation of useful signals is hereby excluded, because the time for the interference suppression is substantially shorter than the pause time of a bit sequence of the useful signals.

The characteristics of such a bandpass filter 23 necessary for the general function of the receiver are essentially that the bandwidth of the receiver is limited, whereby a minimization of the noise of the preceding stages and of the photodiode, and therewith a higher sensitivity for the useful signal, results, and that finally also interference signals outside of the center frequency are suppressed.

The invention claimed is:

1. Method for interference suppression by means of a quality-adjustable bandpass filter (23) in a receiver circuit for carrier-modulated received signals ($S_{in}$), in which the bandpass filtered received signal ($B_{out}$) is demodulated, and a switching process is triggered with the demodulated received signal ($D_{out}$), characterized in that a quality reduction of the bandpass filter (23) is correlated with the switching process, as the demodulated received signal ($D_{out}$), a first rectangular pulse corresponding to the envelope curve of the carrier-modulated received signal ($S_{in}$) is generated for triggering the switching process, and dependent on one of the edges of the first rectangular pulse ($D_{out}$), a phase shifted second rectangular pulse ($D_{tqr}$) is derived as a control signal (72) for the quality reduction of the bandpass filter (23).

2. Method according to claim 1, characterized in that the time duration of the quality reduction is limited at least to the duration of the interference triggered by the switching process.

3. Method according to claim 1, characterized in that the second rectangular pulse ($D_{tqr}$) follows in time directly after the first rectangular pulse ($D_{out}$).

4. Method according to claim 1, characterized in that the switching process is initiated with the first edge of the first rectangular pulse ($D_{out}$) and the switching process is ended with the second edge of the first rectangular pulse ($D_{out}$).

5. Method according to claim 1, further characterized in that the bandpass filtered received signal ($B_{out}$) in the form of pulse signals ($Comp_{sig}$) is quantized as pulse trains and the pulse trains are integrated up over their pulse pauses to an integral value to generate the control signal for controlling the quality reduction of the bandpass filter.

6. Method according to claim 5, characterized in that upon missing of pulse trains ($Comp_{sig}$), after a certain time duration, the upward integration is ended and the integral value is returned back or reduced.

7. Method according to claim 1, characterized in that, before the bandpass filtering, the received signal is subjected to an automatic gain control dependent on a regulating value determined by the signal magnitude of the received signal and the surrounding ambient environmental conditions.

8. Method according to claim 7, characterized in that the automatic gain control is switched to inactive during the demodulation of a bandpass filtered received signal.

9. Method according to claim 1, further characterized in that the bandpass filtered received signal ($B_{out}$) in the form of pulse signals ($Comp_{sig}$) is quantized and these pulse trains are integrated up over their pulse pauses to an integral value.

10. Method for interference suppression by means of a quality-adjustable bandpass filter (23) in a receiver circuit for carrier-modulated received signals ($S_{in}$), in which the bandpass filtered received signal ($B_{out}$) is demodulated, and a switching process is triggered with the demodulated received signal ($D_{out}$), characterized in that a quality reduction of the bandpass filter (23) is correlated with the switching process, before the bandpass filtering, the received signal is subjected to an automatic gain control dependent on a regulating value determined by the signal magnitude of the received signal and surrounding ambient environmental conditions, as the demodulated received signal ($D_{out}$), a first rectangular pulse corresponding to the envelope curve of the carrier-modulated received signal ($S_{in}$) is generated for triggering the switching process, dependent on one of the edges of the first rectangular pulse ($D_{out}$), a phase shifted second rectangular pulse ($D_{tqr}$) is derived as a control signal (72) for the quality reduction of the bandpass filter (23), and for switching the automatic gain control to inactive, a third rectangular pulse ($D_{stop\text{-}agc}$) that is phase-shifted relative to the first rectangular pulse ($D_{out}$) is generated, of which the pulse width is longer than that of the first rectangular pulse ($D_{out}$).

11. Method according to claim 10, characterized in that the first, second and third rectangular pulse ($D_{out}$, $D_{tqr}$, $D_{stop\text{-}agc}$) respectively is generated dependent on integral values both during the upward integration as well as during the return back or reduction.

12. A circuit arrangement for suppressing switching interference, the circuit arrangement comprising an input amplifier (1) adapted to receive and amplify a modulated received signal, a regulating amplifier (21) and a bandpass filter (23) connected on an output side of the input amplifier, a demodulator having an input connected to an output side of the bandpass filter and having a control signal output connected to and adapted to provide a control signal ($D_{tqr}$) to a control input of the bandpass filter, and a switching arrangement having a control input connected on an output side of the demodulator, wherein the bandpass filter (23) comprises a second order filter according to a transfer function F(s):

$$F(s)=(s/\omega_0)/(1+(s/(\omega_0 Q))+(s^2/\omega_0^2))),$$

wherein s represents the Laplace transform, $\omega_0$ represents the resonance frequency, and Q represents the quality of the filter, and wherein the bandpass filter further comprises a change-over switch (239) adapted to switch the quality Q between two different quality values $Q_1$ and $Q_2$ dependent on the control signal ($D_{tqr}$) correlated to a switching process of the switching arrangement.

13. Circuit arrangement according to claim 12, wherein the demodulator comprises a comparator (311) connected on the output side of the bandpass filter (23) and adapted to generate pulse trains at a comparator output, an analog integrator (313) having an input connected downstream to the comparator output and having an integrator value output, and plural Schmitt triggers (316, 317, 318) having respective inputs connected to the integrator value output and respectively having different hysteresis values.

14. Circuit arrangement according to claim 13, wherein the Schmitt triggers (316, 317, 318) respectively have outputs connected with a NAND gate (L3) adapted to generate the control signal ($D_{tqr}$) at the control signal output of the demodulator.

15. Circuit arrangement according to claim 13, further comprising, for an automatic gain control by the regulating amplifier (21), a regulating logic element (41) and a digital-to-analog converter (42) connected between the regulating logic element and the regulating amplifier, wherein the regulating logic element (41) has one input connected with the output side of the bandpass filter (23) and another input connected with one of the Schmitt triggers (317) of the demodulator (31).

16. A method of suppressing switching interference, comprising the steps:
a) receiving and optionally processing a modulated signal to produce an input signal;
b) bandpass filtering said input signal to produce a filtered signal;
c) demodulating said filtered signal to produce a demodulated signal comprising a first rectangular pulse corresponding to an envelope curve of said input signal;
d) controlling a switching state of a switching arrangement with said demodulated signal so as to change said switching state in response to and dependent on said first rectangular pulse;
e) producing an output signal through said switching arrangement in response to and dependent on said switching state; and
f) producing a control signal comprising a phase shifted second rectangular pulse dependent on one edge of said first rectangular pulse, and temporarily reducing a filter quality of said bandpass filtering in correlation with said change of said switching state in response to said control signal.

17. The method according to claim 16, wherein said change of said switching state temporarily produces switching interference in said input signal provided to said bandpass filtering, and said reducing of said filter quality reduces or suppresses an influence of said switching interference on said filtered signal produced by said bandpass filtering.

18. The method according to claim 16, wherein said filtered signal ($B_{out}$) is in the form of pulse signals ($Comp_{sig}$) and is quantized as pulse trains, and the pulse trains are integrated up over their pulse pauses to an integral value to produce said control signal for controlling the reduction of the quality of said bandpass filtering.

19. The method according to claim 16, wherein said filtered signal ($B_{out}$) is in the form of pulse signals ($Comp_{sig}$) and is quantized and these pulse trains are integrated up over their pulse pauses to an integral value.

20. A circuit arrangement for suppressing switching interference, comprising:
a signal receiver arrangement adapted to receive a modulated signal at an input thereof and to provide an input signal at a receiver arrangement output thereof;
an adjustable-quality bandpass filter having a filter input connected to said receiver arrangement output, a filter output, and a control input, wherein said bandpass filter has an adjustable filter quality that is adapted to be adjusted in response to and dependent on a filter control signal provided to said filter control input;
a demodulator having a demodulator input connected to said filter output, a demodulator output adapted to provide a demodulated signal, and a control output connected to said control input of said bandpass filter and adapted to provide the filter control signal timecorrelated with the demodulated output signal; and
a switching transistor having a control terminal connected to said demodulator output, and a switched conduction path adapted to be switched and to produce an output signal in response to and dependent on the demodulated signal provided to said control terminal;
wherein said bandpass filter comprises a second order filter according to a transfer function F(s):

$$F(s)=(s/\omega_0)/(1+(s/(\omega_0 Q)+(s^2/\omega_0^2)))$$

wherein s represents the Laplace transform, $\omega_0$ represents the resonance frequency, and Q represents said adjustable filter quality of said bandpass filter, and wherein said bandpass filter further comprises a quality change-over switch that has a switch control terminal connected to said control input in said bandpass filter and that is adapted to switch said adjustable filter quality between different first and second quality values.

* * * * *

UNITED STATES PATENT AND TRADEMARK OFFICE
CERTIFICATE OF CORRECTION

PATENT NO. : 7,236,743 B2
APPLICATION NO. : 10/344141
DATED : June 26, 2007
INVENTOR(S) : Eichin et al.

Page 1 of 1

It is certified that error appears in the above-identified patent and that said Letters Patent is hereby corrected as shown below:

Column 2,
Line 13, before "According", insert --This object is achieved in a method of the general type discussed above, as further developed according to the invention.--;

Column 6,
Line 23, before "negative", insert --only ends at the time point $t_6$. Thereafter, a--;

Column 10,
Lines 22 and 23, after "signal", replace "timecorrelated" by --time-correlated--.

Signed and Sealed this

First Day of July, 2008

JON W. DUDAS
*Director of the United States Patent and Trademark Office*